Feb. 1, 1955 — K. E. GOIT — 2,700,926

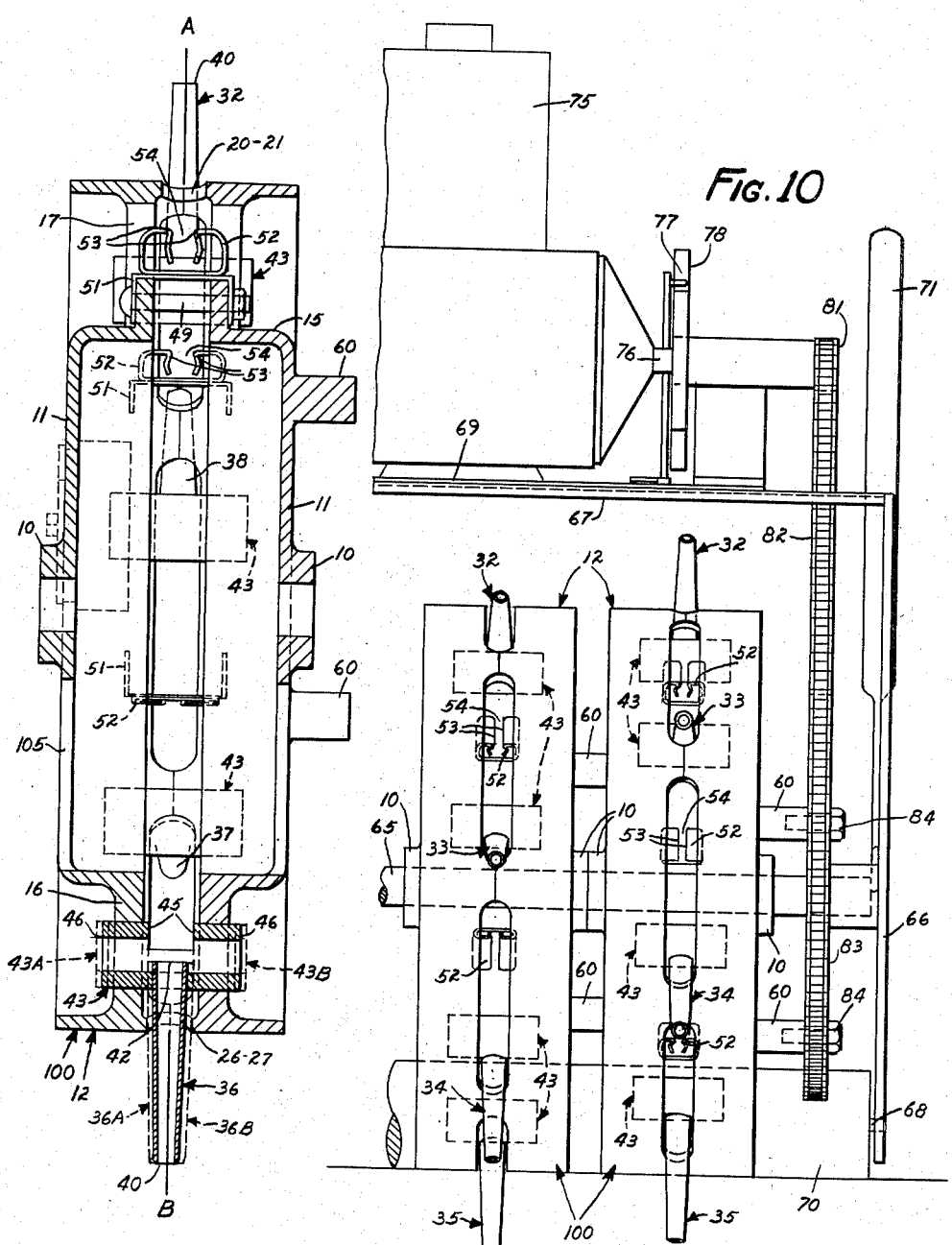

TURF PENETRATING WHEEL

Filed July 1, 1950 — 6 Sheets-Sheet 3

INVENTOR.
KENNETH E. GOIT
BY Paul, Paul & Moore
ATTORNEYS

INVENTOR.
KENNETH E. GOIT
BY
Paul, Paul & Moore
ATTORNEYS

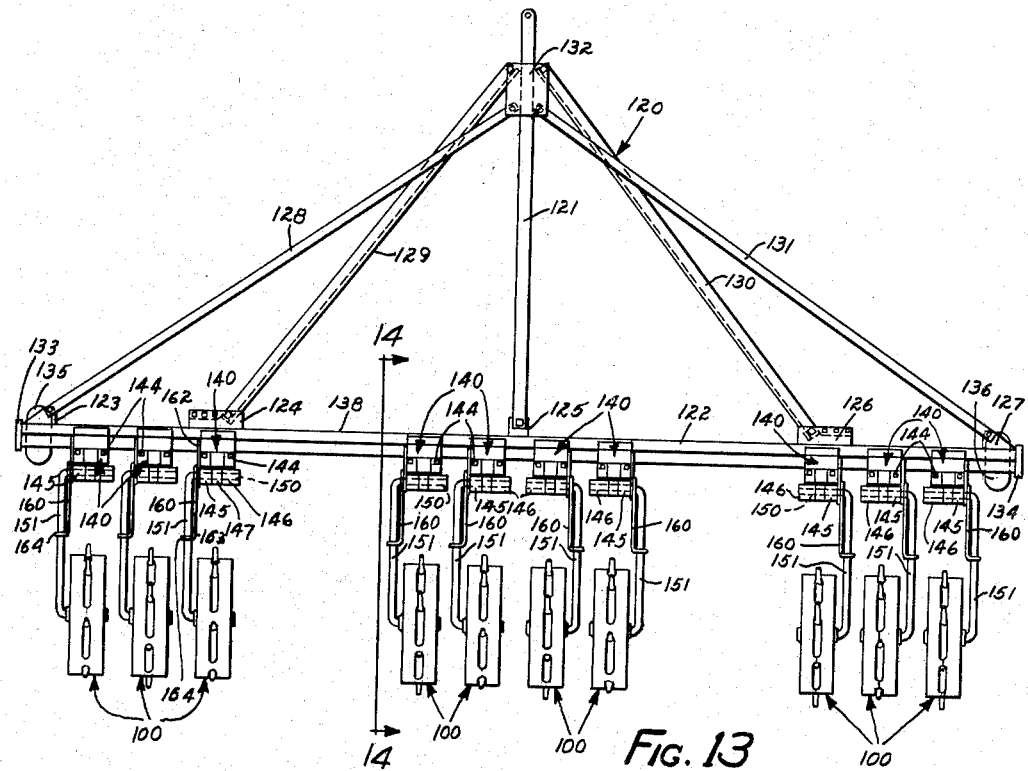

United States Patent Office 2,700,926
Patented Feb. 1, 1955

2,700,926

TURF PENETRATING WHEEL

Kenneth E. Goit, Minneapolis, Minn.

Application July 1, 1950, Serial No. 171,769

5 Claims. (Cl. 97—216)

In grassland farming and in the maintenance of lawns, grassy areas, golf courses and the like, a fundamental problem has always existed due to the fact that once the sod has been established, cultivation is impossible without destroying the sod. Plowing or discing so severely cuts the sod as to destroy it for many purposes and such working requires complete re-establishment thereof by seeding or the like methods. Yet, in connection with sod growth, as in connection with the growth of other plants, it is desirable to provide a working of the soil so as to permit aeration of the soil, ready entrance of moisture and the economical application of fertilizers.

It has heretofore been proposed to provide a type of cultivation of the sod and grassland areas by passing over the area a wheeled machine carrying a large number of spikes which enter the soil and produce holes through the sod and into the underlying dirt. These machines and methods have been subject to disadvantage, for while they produce an indentation into the soil, in doing so they so impact the earth around the indentation as to render absorption of moisture and fertilizers difficult. Thus, when a spike or probe is driven into any soil, the soil particles which are displaced by the spike or probe are forced into the surrounding soil areas, thus producing a degree of compaction around the hole produced, which is roughly proportional to the amount of soil displaced. This compaction results in sealing of the wall of the indentation to such an extent that absorption of air and water are severely reduced. This condition is increased where the soil includes clay constituents, gumbo or the like.

It is an object of the present invention to provide an improved implement for providing apertures through sod and into the underlying soil or into soil without severe compaction, to allow adequate aeration and rainfall drainage.

It is a further object of the invention to provide an implement wheel having thereon a plurality of projecting coring tools for coring sod or soil at intervals therealong.

It is another object of the invention to provide an improved implement, more particularly a wheel having coring tools projectable under working conditions for coring holes at intervals along a sod or soil surface over which the wheel is rolled and which coring tools may be optionally swung within the circumference of the wheel for transport service.

It is another object of the invention to provide subassemblies including improved coring tools for agricultural implements.

It is also an object of the invention to provide in a gang implement a plurality of ground engaging wheels, each provided with coring tools for producing in the soil or sod over which the implement is traversed, a plurality of soil or sod aerating and water absorbing holes therein, without undue compaction.

It is another object of the invention to provide a soil aerating implement having a plurality of independently mounted ground engaging wheels each provided with soil coring tools thereon movable from soil-coring to a retracted transporting position.

It is another object of the invention to provide a soil aerating device for coring from the soil a plurality of sod or soil cores over which the implement is moved, and in such an implement to provide for varying the ground-engaging pressure at the will of the operator to provide for adjustment of the apparatus for uniform or row-crop action and to provide for ready transport or coring operation.

It is a further object of the invention to provide a self-propelled soil coring tool.

Other and further objects of the invention are those inherent in the apparatus herein illustrated, described and claimed.

The invention is illustrated with reference to the drawings in which corresponding numerals refer to the same parts and in which Figure 1 is a side elevational view partly broken away and partly in section of the soil coring and aerating wheel of the instant invention;

Figure 2 is a sectional view taken along the line and in the direction of arrows 2—2 of Figure 1;

Figure 4 is an end elevation of one of the coring tools shown separated from the remaining apparatus, whereas Figure 5 is a side elevational view of the same coring tool;

Figure 8:
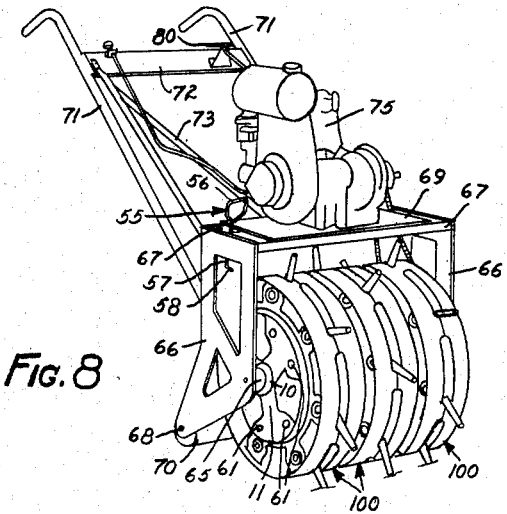
Figure 9:
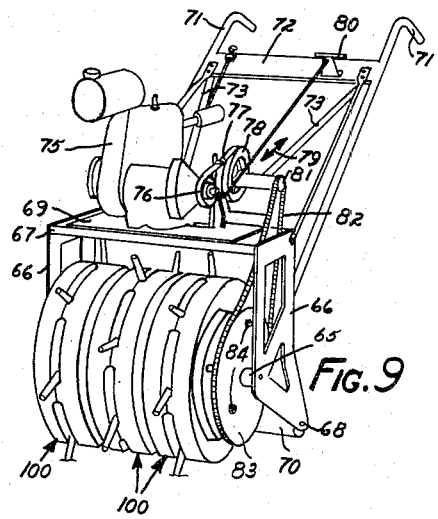
Figure 7:
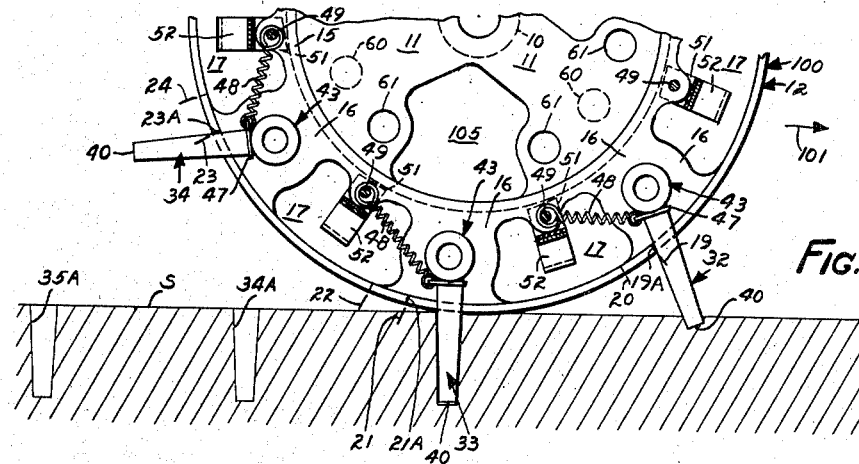
Figure 6:
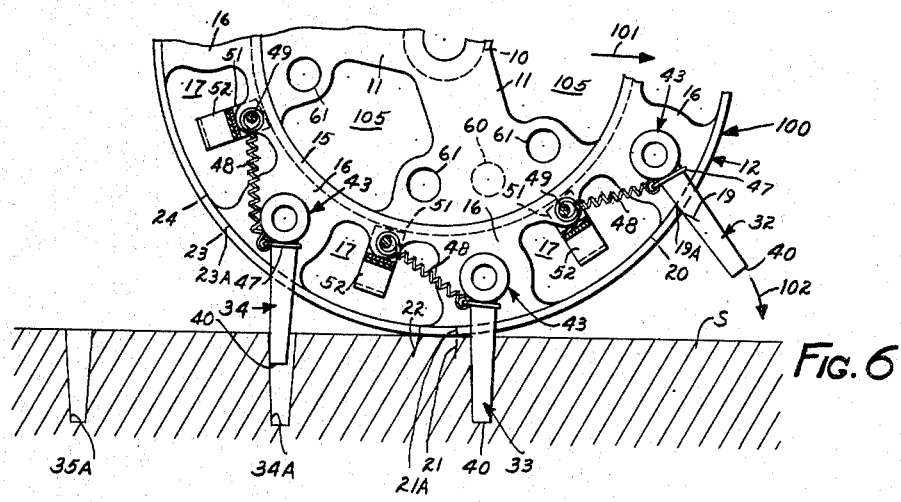
Figure 11:
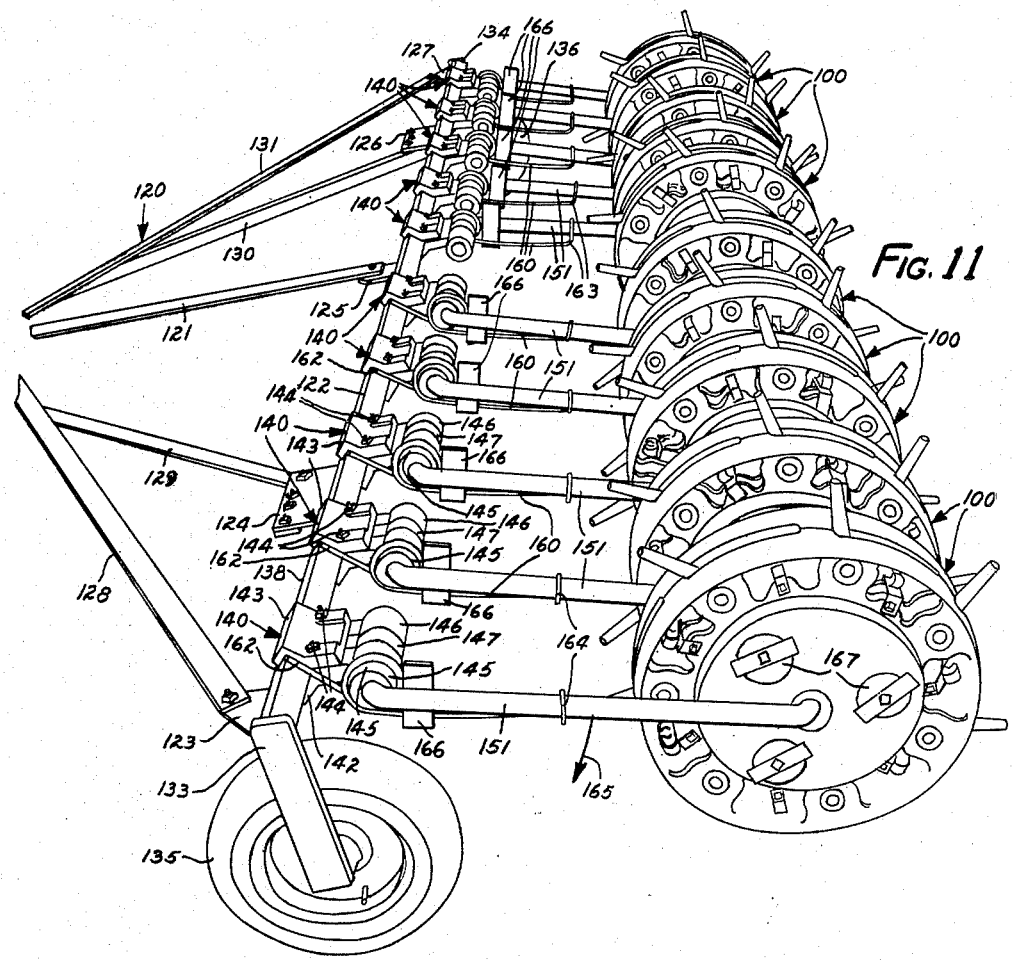
Figure 12:
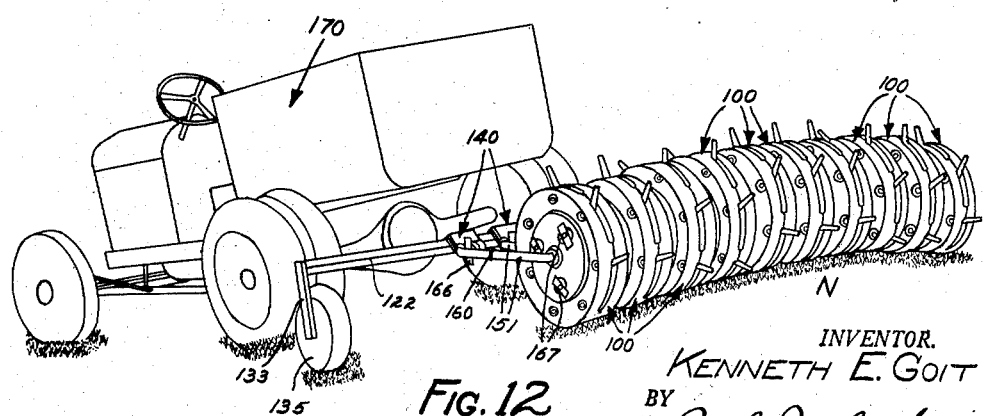

Figure 6 is a fragmentary view of one of the coring wheels of the invention, showing one coring tool fully entered into the soil or sod and another approaching the sod or soil, whereas Figure 7 shows the same wheel at a slightly further point of travel with the coring tool which was approaching the sod or soil surface in Figure 6 now beginning to enter the surface, the fully entered coring tool beginning to withdraw and another which had begun to withdraw in Figure 6 now, in Figure 7, fully withdrawn from the soil or sod;

Figure 8 is a perspective view from the front left quarter showing a self-propelled (motor driven) soil coring and aerating machine utilizing a plurality of wheels of the type shown in Figures 1–7 ganged together;

Figure 9 is a front right perspective view of the same machine shown in Figure 8;

Figure 10 is an enlarged fragmentary front elevational view showing a part of the drive mechanism and several of the soil coring and aerating wheels of the machine shown in Figures 8 and 9;

Figures 11 through 14 illustrate another form of the invention utilizing the soil coring and aerating wheels of the type shown in Figures 1–7, but ganged so as to be drawn by a draft implement, Figure 11 being a perspective view from the left side and looking down on the implement, Figure 12 illustrating a rear quarter view in perspective and showing the draft vehicle with the implement attached therebehind and being drawn over a knoll in an irregular grassy surface, Figure 13 illustrating the implement of Figure 11 but showing the soil coring and aerating wheels grouped as for row-crop operation, and Figure 14 being a side sectional view taken along the line and in the direction of arrows 14—14 of Figure 13.

Referring to the drawings, particularly to Figures 1–7, the wheel generally designated 100 comprises a hub 10 which is connected by suitable spokes 11 to an outer rim generally designated 12 which is the ground-engaging rim of the wheel. The wheel may be made in many forms, but for convenience of manufacture, is preferably made as two enantiomorphic halves, the wheel being divided into the halves along a median plane perpendicular to the axis of the hub 10. These halves are best shown in Figure 2 wherein the dividing plane is at A—B. In the illustrated form of wheel the spokes 11 of each half, which emanate from the hub, are joined first to an inner rim at 15, and the inner rim is attached to the outer rim 12 by the inset webs 16—16 which have openings 17—17 between them at uniformly spaced intervals around the wheel.

Figure 1:
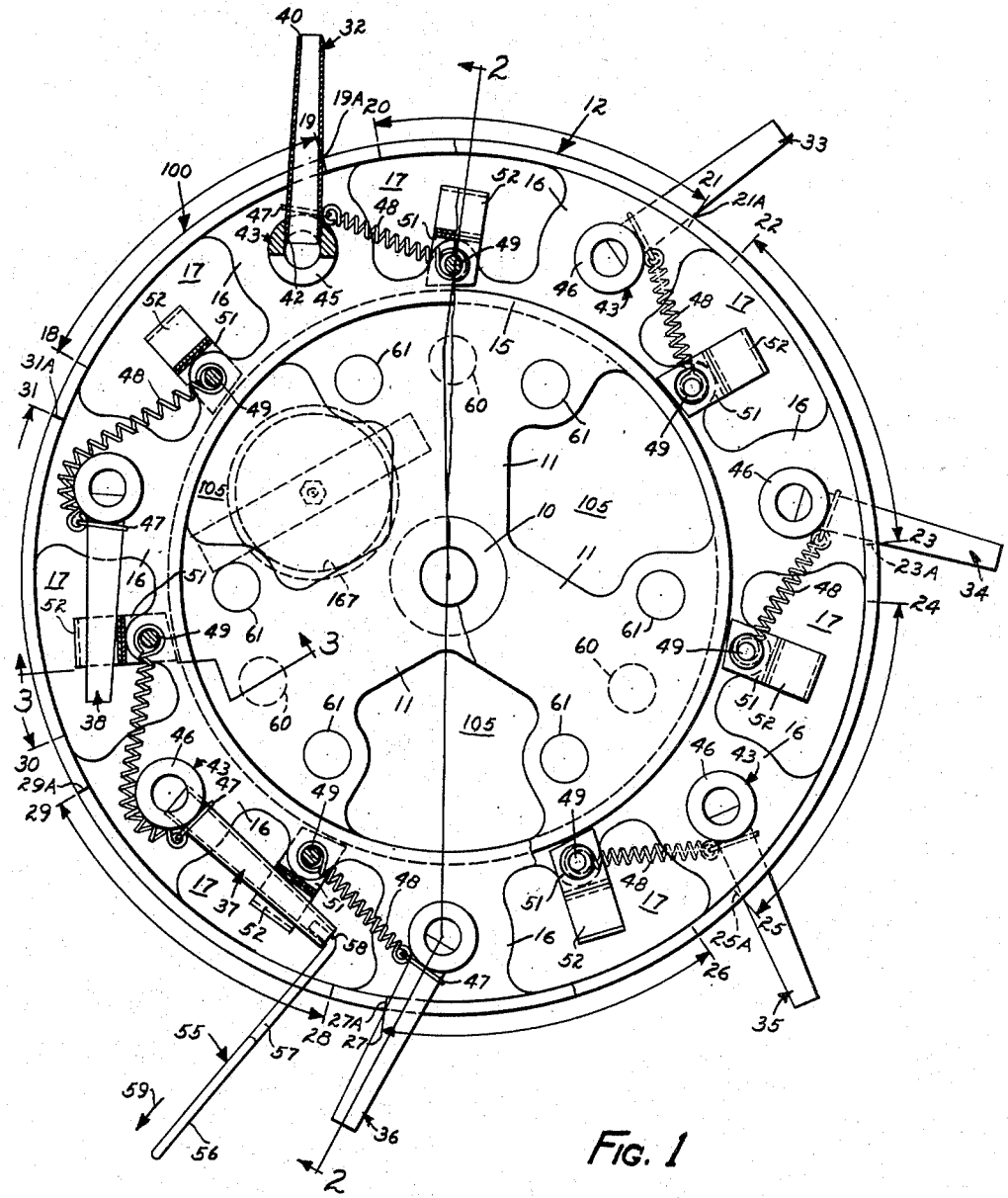

In the rim 12 of the wheel there are provided elongated apertures which extend as shown in Figure 1 from 18 to 19; 20 to 21; 22 to 23; 24 to 25; 26 to 27; 28 to 29; and 30 to 31. Between these elongated apertures are lands as between 19 and 20; 21 and 22; 23 and 24; 25 and 26; 27 and 28; 30 and 31; and 31 and 18. The apertures have a length and width such that the coring tools, generally designated 32—36, as hereinafter described, are able to swing arcuately about their mountings from the operating position shown for coring tools 32—36, thence through the apertures to the transporting condition within the rim 12, as shown for coring tools 37 and 38 in Figure 1.

The webs 16—16 of each of the two halves of the wheel are inset from the edge of rim 12 and apertured so as to form journals in which the mounting shafts of the coring tools 32—38 may conveniently be placed.

Figures 4, 5:
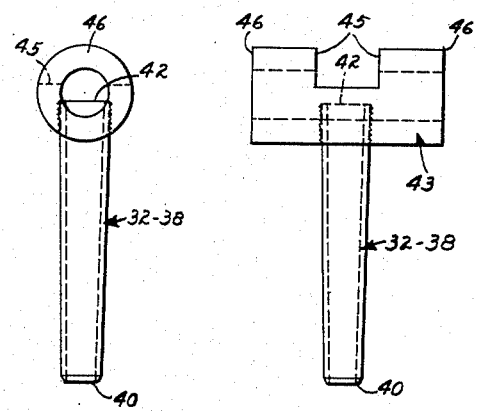

Referring to Figures 1, 4 and 5, particularly, it will be observed that the coring tools generally designated 32—38 are located at uniformly spaced intervals around wheel 100. These coring tools are identical. Thus, each coring tool has a tapered tubular coring member which is sharpened at the outer end 40 so as to present a sharp cutting surface to the turf or soil. Both the inside and the outside of these tubular members are tapered; thus the bore of the coring tool increases from the cutting edge 40 to the threaded mounting end 42 and the outer diameter likewise increases in the same way so that the coring tools have a wall thickness which is substantially uniform from the cutting to the mounting ends. Each of the coring tools is threaded at 42 at the mounting end and is threaded into a suitably threaded hole in the tubular mounting shaft 43 on which the coring tool swings. Each mounting shaft is cut away at the back 45 opposite to the place where the coring tools are screwed in and there are accordingly free and uninterrupted passageways for the cores to move through the tubes and thence out through the openings 45. The increase in diameter from the cutting end 40 to the mounting end 42 of the coring tube makes the passage of the core therethrough easy, since additional clearance between the core and the inside wall of the coring tube is provided as the core moves towards the discharge end 42. When the coring tools 32—38 wear or become dull, they can be re-sharpened at the end 40, and when it is desired they can be replaced by merely screwing out the tube and screwing in a replacement tube, all without removing shafts 43 from the wheel. The entire unit shown in Figures 4 and 5 is adequately treated for rustproofing, as by zinc or cadmium plating.

The two ends 46—46 of the tubular mounting shaft 43 of each of the coring tools are disposed in the apertures within the web 16—16 of the two halves of the wheel, these apertures being axially aligned so that the axes of the apertures and hence the axis at which each of the tubular mounting shafts 43 is maintained is parallel to the axis of the wheel hub 10. The apertures in the web 16 are located with reference to the elongated apertures 18—19, 20—21, etc., of the rim 12 so that one end, thus 19A of the aperture 18—19 and 21A of the aperture 20—21, etc., serves as a mechanical stop which limits the swinging movement of the coring tool swingable through such aperture to the projected or working position.

The swinging of the coring tools 32—38 is freely provided by the journalling movement of the tubular shafts 43 in the webs 16 and each of the tubular coring tools 32—38 is provided with a biasing spring 48 which normally holds it in the protruding (working) condition which is shown for the coring tools 32—36 of Figure 1. These springs are identical for all of the coring tools and hence only one need be described in detail. Thus, for the tool 32 a ring is provided at 47 which encircles the tubular coring tool adjacent its point of attachment to the tubular mounting shaft 43. To the ring 47 there is attached one end of a spring 48, the opposite end of the spring being attached around the bolt 49. The bolts 49, of which there are seven, serve to hold the two halves of the wheel together with the hub portions of the wheels axially aligned and with the lands 19—20, 21—22, etc., through 31—18 of one half of the flange 12 in contact with the corresponding lands of the other half of the flange 12. Hence, the bolts 49 which clamp the two halves of the wheel together serve the additional purpose as anchors for the springs 48.

Figure 3:
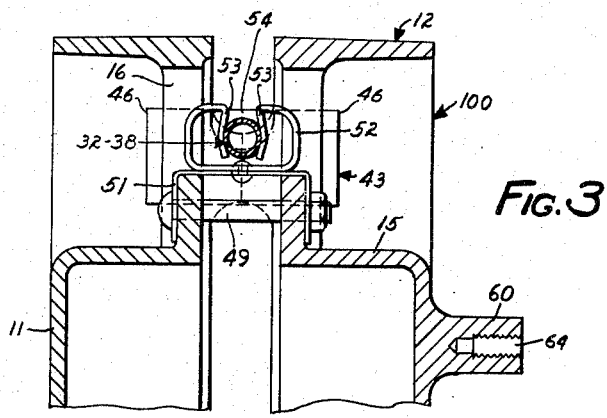
Figure 3 is an enlarged fragmentary sectional view taken along the line and in the direction of arrows 3—3 of Figure 1.

In addition, the bolts 49 serve to attach to the wheel the mounting brackets 51, upon which spring clips 52 are fastened. Clips 52 serve to hold the several coring tools 32—38 in retracted (transporting) condition. Figure 3 shows in detail a clip 52 and its mounting. Thus, the bolt 49 holds the bracket 51 to which in turn there is riveted the spring clip 52, the latter having in-turned spring ends 53 that are spaced from each other so as to offer a slot at 54 through which the tubular coring tool may move and snap to retracted position shown in Figure 3 and also shown for coring tools 37 and 38 of Figure 1. When the coring tools are moved from the position, as for tool 32 of Figure 1, to the position of tool 38, the spring 48 is extended and in its extended position wraps around the large tubular mounting shaft 43 of the coring tool. In swinging thus the coring tool moves through its elongated slot in the rim 12 and thus assumes a retracted position, as for tools 37 and 38 in Figure 1, and in that position the clips 52 hold the coring tools against the influence of springs 48. When all of the tools are thus retracted and clipped within the confines of rim 12, as shown for tools 37 and 38 of Figure 1, the wheel presents only the rim 12 to the ground and hence may be rolled along for transport or for a rolling operation and the like. When it is desired to put the coring and aerating tools into operation it is only necessary to reach through the slot in the rim 12 with a small tool, as shown at 55 in Figure 1. This tool has a handle 56 to which there is connected a shaft 57 which is bent over at 58 so that it can be inserted into the open end of the coring tool into which it is placed. Then the tool is pulled in the direction of arrow 59 and once the tip of the tool is retracted from the spring clip 52, the spring 48 for that tool will cause the entire tool to swing arcuately to a limiting position against the end of its slot in rim 12. In this way all of the coring tools of the wheel or wheels being used can be put into operation from retracted position.

It will be noted that each of the slots 18—19; 20—21 etc., has a width, as illustrated in Figure 2 and elsewhere, sufficiently greater than the coring tool diameter so as to allow the coring tools to slide sideways along the axis of their mounting hubs 43. Thus, as illustrated for the coring tool 36 in Figure 2, the tool which is shown in full lines centrally of the slot 26—27, may move with its hub 43, either direction to the dotted line positions 36A (to the left in Figure 2) and 36B (to the right in Figure 2). This freedom of sliding (sideways) movement greatly assists in that with the free swinging of the tools, turns of the implement are permitted to be made without tearing the turf. This is a feature of the invention. The tools 32—38 normally center along the dividing plane due to the action of the springs 48 in pulling the tools back against the curved ends 19A, 21A, etc., of the slots 18—19, 20—21, etc., through which the tools project.

Each of the spokes 11—11 is provided with an outwardly protruding boss as at 60 and on either side of the boss and at the same radius as the boss is from the center of hub 10, there are provided apertures, as at 61—61. These bosses and apertures are provided so that when several wheels are set adjacent each other on the same axle, the bosses 60 may be entered into the holes 61 of the adjacent wheel and thus a driving relationship from wheel to wheel can be obtained without keying the wheels to the axle. At the same time this permits ready removal of any wheel from a ganged instrument. As shown in Figure 3 the bosses 60 of an end wheel in a gang may be provided with a threaded aperture at 64. This is used for mounting a driving sprocket on one of the wheels, as shown in Figure 9, the driving gear being attached directly against the bosses 60 by suitable cap screws, as will be described.

Referring now to Figures 8-10, in these figures there is illustrated an implement composed of, for example, three of the wheels, as heretofore described, these being ganged together and mounted upon a common shaft 65. A greater or lesser number of such wheels may be provided. The shaft is held at each end upon the side plates 66 of the machine frame, the side plates being attached at the upper level by means of the cross frame members 67 and at the rear lower level by means of the shaft 68 of the ground engaging rear roller 70. Handles 71—71 extend upwardly and rearwardly behind the machine frame, being attached together near their upper ends by the cross plate 72 and adequately braced as at 73. Upon the top frame member 67 there is provided a mounting plate 69 which serves as a base upon which a gasoline engine 75 is adapted to be mounted. This engine, which can be of any convenient type, has a power output pulley at 76 which is belted through the belt 77 to the jack shaft 78 which is mounted so as to be capable of being swung back and forth in the direction of the double arrow 79 by means of the control handles 80, thus permitting the belt 70 to be tightened or loosened so as to act as a mechanical drive clutch for the machine. The jack shaft carrying pulley 78 also carries a sprocket 81 which through the chain 82 drives the large sprocket 83, which as previously mentioned is mounted on the left one of the implement ground perforating and aerating wheels by means of cap screws 84 inserted into the threaded opening 64 in bosses 60 of the outermost wheel. Each of the wheels generally designated 100 of Figure 9 is identical with that previously described with reference to Figures 1–7 and they are ganged so as to be driven one from the other by means of the interlocking relationship between the bosses 60 and the holes 61 of the several wheels. In this way, by virtue of the drive pulley 83 on the wheel 100 shown to the right in Figure 9, there is obtained rotation of that wheel and through it rotation of the remaining wheels 100. Any other suitable engine and power transmission arrangement may be used if desired.

The movement of each of the wheels 100 over the surface of the sod or soil being treated by the implement is best illustrated in Figures 6 and 7, wherein a wheel is shown at several successive stages of rolling. In Figure 6 the wheel rim 12 rolls upon the surface of the sod or soil S and it will be assumed that all of the coring tools 32—38 of the wheel, of which tool 32, 33 and 34 are shown, are extended so as to protrude beyond the rim 12 in coring relation. In Figure 6 the tool 32 projects and is held slightly forward of radial position by the abutment of the tubular coring tool against the surface 19A of its slot 18—19 in the rim 12. The wheel 100 in Figure 6 may be assumed to move in the direction of the arrow 101. Hence, the tubular coring tool 32 is progressing downward and forward as shown generally by the arrow 102. At the instant shown in Figure 6 the tubular coring tool 33 has fully entered the soil, being at this time extended in a substantially radial position and in so doing the sharp cutting edge 40 of the coring tool 33 has entered the sod or soil S and a core, not illustrated, is positioned within the interior of such tool. At the same time the rolling action has caused the tool 33 to be moved against the action of its springs 48 slightly away from the end 21A of the slot 20—21, and this movement continues as illustrated for the tubular coring tool 34 which has already withdrawn considerably from the hole 34A in the sod or soil S, which it has already produced. Another hole 35A, which was produced by a coring tool already withdrawn, is also shown in Figure 6. Note that as the coring tools are withdrawn they move pivotally about their tubular mounting shafts 43 always against the action of springs 48, but as soon as they are fully retracted from the holes that they have produced, they snap back to the original position shown for tool 32. This is illustrated in Figure 7 where it will be seen that the coring tool 32 has now begun to enter the soil, whereas the coring tool 33 has very slightly retracted, coring tool 34 having now already moved out of the hole 34A that it produced and upon having done so, the spring 48 rapidly arcuately moved such coring tool 34 against the end 23A of the slot 22—23 through which it has projected. This action continues as the wheel rolls along the ground, and each fresh core which is produced by each coring tool pushes the previous core out through the delivery end 42 of the coring tool and out through the slot 45 in the tubular pivotal shaft 46 on which the coring tool is mounted. These cores, which may consist of cores of sod or soil, are discharged into the space between the webs 16—16 of the wheels and thence they fall into the space between the spokes 11—11 where tumbling around together they are broken up and fall out of the openings 105—105 between the spokes and are sometimes fairly thrown from the wheels when the machine progresses along with alacrity. In this manner a large number of holes can be produced in the surface of the soil or sod very economically and in a short time without compacting the earth around the hole which is produced, which was the fault of previous devices. The cored holes are not visible in sod, yet by the use of the device of this invention the sod (or soil) can be fairly riddled with cored holes, particularly if several passes are made over the sod or soil. The holes allow the soil to breathe and absorb air and moisture. Not only does each hole act as a reservoir for moisture, but in addition the wall of the cored hole remains highly absorptive, since no soil, roots, etc., from the space constituting the cored hole is pushed into the surrounding soil. The cored material, being tumbled and thrown from the wheel (or wheels) 100 is fairly well broken up, and is deposited on the surface where being exposed to sun and rain, it rapidly disintegrates and returns to the surface from which it was taken. The sod cuttings of the cores, where the machine is used on sod, offer no problem, because they, like the underlying soil portions of the cores, soon disintegrate and likewise settle into the surrounding grassy areas, thereby to some degree providing a mulch.

Thus, by utilizing a machine of the type described in Figures 8 and 9, an enormous number of holes per acre can easily be produced in a minimum of time.

Referring particularly to Figures 11—14 there is illustrated another application of the coring-aerating wheel of the instant invention. In Figures 11 and 12 the wheels are ganged together at uniform spacing for treating a grassland area or field where rows of crops are not involved, whereas in Figures 13 and 14 the wheels are grouped so as to allow them to move between rows of growing crops. The machine is the same in each instance, merely the adjustment being changed. Thus, referring to Figures 11, 13 and 14 particularly, there is provided a draft frame generally designated 120 having a drawbar 121 and a cross frame member 122, preferably of square tubular cross section. The cross frame member 122 is arranged so that its diagonal 122A is vertical, as shown in Figure 14, and lugs are provided at 123—127 to which there are attached the drawbar 121 and a plurality of angularly extending braces 128, 129, 130 and 131, the braces being attached at their forward end to a gusset plate 132 welded to the drawbar 121. The plates 124 and 126 are provided with a plurality of holes to allow for slight flexing of the cross frame member 122. At each end of the cross frame member 122 there is a downwardly extending plate 133 or 134 on the inside of which there is respectively mounted a small rubber tired ground-wheel 135 and 136; these wheels serve to support the relatively small weight of the draft frame 120. It will be noted that each of the lugs 123—127 is attached by welding or otherwise to the forward angle 138 of the cross frame members 122 and hence nearly the entire periphery of the square cross frame member 122 is therefore available for attachment to it of the clamps supporting the ground wheels.

Thus, to the bar 122 there are attached as many clamps and rearwardly extending arms carried thereby as is desired for supporting the requisite number of ground engaging coring and aerating wheels 100 desired for the particular installation. Each of the clamps generally designated 140 has a lower portion 141, the forward end 142 of which is shaped to embrace the lower half of the periphery of the cross frame member 122 and an upper portion 143 which embraces and clamps against the upper portion of the bar 122. These are held together by through bolts as at 144. Each member 141 extends rearwardly and terminates in spaced hubs 145—146 with a space 147 between them, these hubs being drilled so as together to provide a bearing through which the bent-over end 150 of the rearwardly extending cross arm 151 is adapted to be pivotally mounted. In the space 147 and around the pivoting end 150 of the arm 151 there is provided a collar which is sutably attached by means of a set screw or pin, thus preventing the end 150 from moving out of the hub portions 145 and 146, while yet freely allowing the arm 151 to swing arcuately up and down about the axis of the hub. The rear or trailing end of the arm 151 is likewise bent over and it extends horizontally as a stub shaft through the hub of the wheel 100, being provided at its end with a washer and suitable pin to prevent the wheel from coming off. In addition, there may optionally be provided a spring at 160 which is wrapped around the hub 145 and has a forward end 162 bearing down upon the square cross frame member 122 and a rear end 163 which extends back and is provided with a loop at 164 over the rearwardly extending arm 151. The spring is tensioned so that it provides a downward force, which causes the arm 151 to be moved downwardly in the direction of arrow 165 as shown in Figures 11 and 14, thus imposing upon the wheel 100 a ground-engaging force in addition to that provided by its own weight. Plates 166, one welded to each of the arms 151, prevent the springs from moving off the ends of hub portions 145, thus by a simple means holding the springs in place. If desired, wheel weights 167 may be attached to one half of the wheel 100, as shown in Figure 11, to add greater weight for specific applications, the opposite half being as previously described so as to allow the cut cores to be discharged.

In order to change from the even distribution of Figure 11 to any pattern distribution of Figure 13, it is only necessary to loosen the bolts 144 of the clamping devices 140 holding the rearwardly extending arms 151. When loosened the clamping device 140, which consists of the lower portion 142 and the upper portion 143, may be moved sideways along the bar 122, it being noted that the clamp will slide readily over the forwardly extending lugs 123—127, thus permitting any adjustment along the transverse length of the bar 122. In this way the row crop pattern, shown, for example, in Figure 13, or any other pattern, may be obtained, and more or less wheels may be added to the bar 122 for a coarser or finer coring and aerating action.

In Figure 12 there is illustrated in perspective the action of the machine shown in Figures 11 and 13. In this instance the implement is being towed behind a traction vehicle 170 and the ground-engaging wheel 135 and its corresponding wheels 136 at the other end of the mounting bar 122 determine the position of the bar 122, depending upon the particular ground level involved. In the implement shown in Figure 12 a number of wheels 100 are provided, but the bar 122, it will be noted, extends well out to the left side beyond the left-most wheel 100, thus illustrating that a narrower or wider width may be used as desired, without changing the bar 122. There is also illustrated in Figure 12 the action of the various wheels 100 as they encounter a knoll N in the grassy slope, it being noted that the wheels follow the particular undulations of the grassy slope due to their freedom of movement up and down while being drawn forward by the towing arm 151.

The mechanisms of this invention can be used at speeds up to 7–8 miles per hour without injury, the type shown in Figures 8 and 9 being limited only by the operator's ability to keep up with it. Daily capacity depends upon the swath treated and the speed.

It is obvious that many variations may be made in the construction of the device without departing from the spirit of the invention illustrated and claimed. Thus, the wheel may be made in one part instead of two and differently constructed so long as it is provided with coring tools as described.

As many apparently widely different embodiments of this invention may be made without departing from the spirit and scope thereof, it is to be understood that I do not limit myself to the specific embodiments herein.

What I claim is:

1. An implement comprising a wheel having a ground-engaging rim, a plurality of circumferentially elongated apertures in the rim at spaced intervals therearound, a plurality of coring tools each being hollow throughout its length, means pivotally mounting each coring tool on an axis which is within the rim and substantially parallel to the wheel axis for swinging movement of said coring tools to a working position in which the tools project outward through said rim apertures and for reverse swinging movement through the elongated apertures to a retracted position wholly within the rim of the wheel, and spring clip means on the rim for individually and releasably retaining each of the retracted coring tools in retracted position.

2. An implement comprising a wheel having a ground engaging rim and hub, said wheel being divided along a median plane perpendicular to the wheel axes into two complementary halves, a plurality of elongated apertures at spaced intervals in said rim, each aperture formed partly in each half of the wheel, a plurality of coring tools, each of which is hollow throughout its length, means at one end of each tool pivotally mounting it on the wheel on an axis substantially parallel to the axis of the wheel hub and for swinging movement of the tool from a retracted position of transporting wherein the tool is wholly within the rim of the wheel to a projecting position in which the tool protrudes outwardly beyond said rim, said tools being mounted for such swinging movement through the elongated apertures in the rim, resilient means for pivoting the coring tools on the hubs.

3. An implement comprising a wheel having a ground-engaging rim and hub, said wheel being divided along a median plane perpendicular to the wheel axis into two enantiomorphic integral halves, a plurality of elongated apertures at spaced intervals in said rim, each aperture formed partly in each half of the wheel, a plurality of coring tools each of which is hollow throughout its length, means at one end of each tool pivotally mounting it on the wheel on an axis substantially parallel to the axis of the wheel hub and for swinging movement of the tool from a retracted position of transporting, wherein the tool is wholly within the rim of the wheel, to a projecting position in which the tool protrudes outwardly beyond said rim, said tools being mounted for such swinging movement through the elongated apertures in the rim, spring means for biasing the swinging movement of said coring tools to their projecting position, the axis of pivotal mounting of each tool being located with reference to the elongated rim aperture through which the tool swings so that the adjacent aperture end wall forms a stop holding the tool in a projected position.

4. An implement comprising in combination a ground wheel provided with circumferential slots in the rim, hollow tubular coring tools positioned within the wheel and projecting through the slots, each hollow coring tool having one end attached to a pivot means positioned on the wheel on an axis substantially parallel to the axis of the wheel and within the circumference of the wheel, and the other end comprising a ground engaging means, said pivot means having ends one disposed on each side of said hollow coring tool and journalled for pivotal rotation of said tool, and each pivot means so positioned as to provide a free and uninterrupted passageway for a core as it moves through said hollow tool from said ground engaging end through said pivoted end, means on the wheel and within the rim for individually receiving and holding the tools releasably therein, and said slots being of such extent to permit swinging movement of the tools therethrough from a retracted position to an extended position.

5. The apparatus of claim 4 further characterized in that the means for individually receiving and holding the tools therein comprises a spring clip for each tool.

References Cited in the file of this patent

UNITED STATES PATENTS

| Number | Name | Date |
|---|---|---|
| 675,968 | Ogden | June 11, 1901 |
| 733,634 | Dungan et al. | July 14, 1903 |
| 897,057 | Brooks | Aug. 25, 1908 |
| 1,272,231 | Davis et al. | July 9, 1918 |
| 1,541,894 | Bevill | June 16, 1925 |
| 1,757,511 | Brewer | May 6, 1930 |
| 1,905,384 | Jass | Apr. 25, 1933 |
| 1,992,313 | Langley | Feb. 26, 1935 |
| 2,131,324 | Hull | Sept. 27, 1938 |
| 2,244,099 | Chase | June 3, 1941 |
| 2,323,460 | Domrese et al. | July 6, 1943 |
| 2,325,997 | Kelley et al. | Aug. 3, 1943 |
| 2,580,236 | Mascaro | Dec. 25, 1951 |
| 2,649,061 | Hawkins et al. | Aug. 18, 1953 |

FOREIGN PATENTS

| Number | Country | Date |
|---|---|---|
| 34,922 | Germany | May 19, 1886 |